Patented May 9, 1944

2,348,458

UNITED STATES PATENT OFFICE 2,348,458

METHOD OF PREVENTING LANDSLIDES

Victor A. Endersby, Lafayette, Calif., assignor to Shell Development Company, San Francisco, Calif., a corporation of Delaware No Drawing. Application April 28, 1943, Serial No. 484,945

13 Claims. (Cl. 61—36)

The present invention pertains to methods of preventing landslides and relates particularly to methods of treating underground strata of absorbent clays, particularly bentonitic clays, to prevent their becoming wet to the point of forming slurries and causing landslides.

Since water absorption by bentonitic clays is quite rapid and since the mechanical strength of bentonitic clays drops off sharply at a critical water saturation, water absorption by bentonitic strata often causes sudden large shifts of overlying earth masses without warning. Water absorption by other absorbent clays which form aqueous slurries may also cause landslides, but these are less serious to combat because the mechanical strength of such clays decreases much more gradually with increasing water saturation than does that of bentonitic strata and thus the resulting landslide generally moves more slowly or in smaller earth masses or discontinuously for shorter distance. Therefore, although the present method may be used to treat, in general, absorbent clay strata which are potential causes of landslides, the method of the present invention is particularly applicable to the treatment of bentonitic strata for preventing unheralded and sudden landslides of disastrous proportions. For sake of simplicity only, however, the invention is described hereinbelow in relation to its particular application to bentonitic strata.

The prevention of landslides is particularly important in the construction of dams, foundations for heavy structures and the like. Heretofore, asphalt emulsions have been used to solidify soils in such areas. It has now been found that strata of bentonite and bentonitic clays in mountains are frequently subject to the action of infiltrating water and thus cause a great number of landslides. The water entering the bentonitic strata results in the swelling of the bentonite or bentonitic clay and reduction of the viscosity approaching that of a slurry, which then may cause the sudden downward movement of the overlying mass to a more stable position. However, bentonitic clays have such a low permeability due to compaction or swelling thereof after absorption of water, that the heretofore proposed relatively viscous asphalt emulsions and like solidifying agents cannot be injected into the fine bentonitic strata. When such injection is attempted the viscous solidifying liquids generally are forced into the more permeable surrounding strata leaving the bentonitic stratum or seam still relatively free to absorb more water until a slurry of the bentonite is formed, whereby a slide occurs.

It is an object of this invention to provide a method of preventing landslides due to absorption of water by absorbent clay strata by treating said strata with a material which may be easily injected deeply into said strata and which is capable of preventing absorption of water by the bentonite.

It is a particular object of this invention to provide a method of preventing landslides due to absorption of water by bentonitic clay strata by treating said bentonitic strata with a material which may be easily injected deeply into said strata and which is capable of preventing absorption of water by the bentonite.

In some particular cases, such as in constructing dams, it is found by core drilling (or other suitable subsurface investigation) that a desired earth cut or excavation cannot be made without danger of slides because of an underlying bentonitic strata containing a certain amount of absorbed water, which, although perhaps not sufficient to cause a slide in itself, would result in an incipiently dangerous condition. If the excavation or cut were made in earth under this condition, a serious landslide would in all probability occur upon the further absorption of a slight amount of water from even light rain or sometimes foggy weather.

Therefore, a special object of this invention is to provide a method of preventing landslides comprising the steps of first treating such water-wet bentonitic strata to remove at least part of the water from said strata and thereby to reduce the swelling of the bentonite with an agent, which itself does not cause appreciable swelling of the bentonite, and thereafter treating said bentonitic strata according to the foregoing objects to prevent further entrance of water, all prior to making the desired earth cut, dam or other earth removal operation which would otherwise cause a landslide under untreated soil conditions.

According to the present invention, landslides caused by the formation of bentonitic slurries in underground bentonitic strata due to absorption of water thereby, are prevented by introducing into said strata a low viscosity mineral oil containing an oleophilic cation active wetting agent.

By low viscosity mineral oil is meant a mineral oil having a viscosity low enough to allow the oil to flow readily under the operating hydrostatic pressure head into the desired bentonitic strata. In general, mineral oils having viscosities from about 50 to 500 seconds Saybolt Universal (approximately 0.75 to 10.1 centipoises) at 100° F., and preferably a liquid petroleum distillate having a viscosity range intermediate between kerosene and lubricating oil, i. e. gas-oil, may be used.

Suitable oleophilic cation active wetting agents which are effective for the purpose of the present invention include, for example, quaternary ammonium compounds and the analogous phosphorous, sulfur, arsenic, antimony, etc., compounds; their salts; their derivatives such as chloro-, hydroxo-sulfoether, ester, etc.; primary, secondary or tertiary mono or poly amines and their derivatives, etc. Both these groups of compounds include aliphatic, cyclic, nuclear or extranuclear compounds, preferably containing at least one aliphatic saturated hydrocarbon chain of 8, and preferably, 10 or more carbon atoms. Such compounds are represented by trimethyl cetyl ammonium chloride, lauryl pyridinium chloride, the quaternary salt of diethyl aminoethyl oleyl amide, lauryl quinaldinium bromide, triethyl hexadecyl phosphonium bromide, the ternary sulfonium compound: methyl ethyl cetyl sulfonium methyl sulfate, methyl stearyl amine, chloro palmityl amine, stearic ester of ethanol amine, etc. For additional agents and their methods of manufacture see, for example, Dohse et al., U. S. Patent 2,191,295.

Cationic wetting agents, which were found to be particularly suitable, may be obtained from wax by chlorination and ammonolysis, the former being conducted at a temperature of about 110° C. until a chlorine content of about 30% is reached, and the latter step taking place at about 150° C. in the presence of a solvent such as alcohol. In the following description these cation active compounds will be referred to as "paraffin wax amines," or "wax amines."

A similar group of amines, likewise highly effective for the purposes of the present invention, are the alpha branched aliphatic primary amines, having more than 12 carbon atoms, which are derived from aliphatic mono-olefins by hydrochlorination and ammonolysis, and will be referred to as "alpha methyl amine" or "alpha amine" for short.

The range of concentration of cationic wetting agent in the low viscosity oil is from about .2% to 2% or more, and preferably from .25% to 1% depending on the nature of the wetting agent and the oil used. For example, the minimum effective concentration of "paraffin wax amines" in gas-oil was found to be 0.25%.

Anionic compounds, such as alkyl and aralkyl sulfonates and sulfates, naphthenic acids, lower unsaturated fatty acids, higher fatty acids of 10 carbon atoms or more, e. g. stearic acid, highly aromatic carboxylic acids, alpha amino carboxylic acids, polyhydroxy carboxylic acids, higher polycarboxylic acids, etc. were found to be ineffective for maintaining the oil in the bentonitic strata when they are used alone. Some of these anion-active compounds, however, acquire a certain amount of effectiveness when used in combination with cationic compounds, although this effectiveness remains in general below that of cationic compounds alone.

As illustrative only of a preferred embodiment of the method of the present invention, the following example is given. In the construction of a dam it was necessary to remove a large section of earth forming the wall of a canyon in which the dam was to be placed. Prior to the earth removal operations a careful core drilling into the canyon wall revealed a relatively thin stratum of bentonite, which outcropped further up the canyon wall.

If the dam were constructed without treating said bentonite stratum or seam and the water backed up by the dam were allowed to rise to the point where it could enter the bentonite seam outcropping, a dangerous landslide and loss of the dam would probably occur.

However, according to the present invention, if a quantity of low viscosity gas-oil containing 0.5% of "paraffin wax amines" is introduced into the bentonite seam through the core drilling borehole and other boreholes, some into the bentonite outcropping, then entrance of water into the bentonite seam and the formation of a bentonite slurry with a resulting landslide is prevented.

In laboratory tests core samples and columns of packed bentonite and bentonitic clays were treated with low viscosity mineral oils, such as gas-oil, containing cation active wetting agents, such as "wax amines" and it was found that subsequent to such treatment the water did not displace the oil from the bentonite or bentonitic clay and water could not enter into the packed columns or core samples. No further swelling of the bentonite nor formation of slurries occurred.

Results of tests showing the effect of the use of gas-oil containing cationic agents upon swollen bentonite under conditions simulating nature are reported in the table below. In these tests, a pressure injection apparatus comprising a steel block with a chamber 1 x 1.5 x 30 cm. and fitted with glass windows and openings at each end was used. Dry bentonite was packed in the chamber and water forced in under 100 lbs. per sq. in. After allowing sufficient time for the complete hydration of the bentonite, gas-oil with and without cationic compounds was forced through the sample followed by water under 100 lbs. per sq. in.

|  | Experiment number | | |
|---|---|---|---|
|  | 1 | 2 | 3 |
| Oil used | Gas-oil alone | 1% "paraffin amines" in gas-oil. | 1% "paraffin amines" in gas-oil. |
| Water flow before treatment. | 180 cc./hr. after 18 hrs. swelling. | 180 cc./hr. after 18 hrs. swelling. | 180 cc./hr. after 18 hrs. swelling. |
| Oil flow | 35 cc. in 10 min. | 6.4 cc./hr. for 5 hrs. | 14 cc./hr. for 5 hrs. |
| Water flow after treatment with oil. | 45 cc./hr. for 1st hr.; 6.4 cc./hr. for 5 hrs. | None | 34 cc./hr. for ½ hr.; 20 cc./hr. for 1 hr.; 0 cc./hr. for 5 hrs. |

The above results illustrate that the use of a low viscosity mineral oil containing a cationic compound on wet bentonite produces an effective plug to the continued passage of water. This prevention of entrance of water into the bentonitic material and absorption of water thereby is obtained whether, prior to treatment with the mineral oil, the bentonitic material is wet or dry. In fact, it was found that water up to a certain amount, depending on the nature of the bentonitic material, added to its mechanical strength.

Particularly in the case of bentonite and to a lesser extent in bentonitic clays, the decrease in the mechanical strength of the bentonitic material becomes very rapid with a small increase in the water content over certain critical ranges. In cases wherein the water content of the bentonitic material of an underlying inclined stratum is in or near this incipiently dangerous condition, it is necessary first to remove at least a part of the water without causing an increase in the swelling of the bentonite.

This removal of water is attained by treating the bentonitic stratum with a water soluble, substantially non-polar solvent, i. e. a solvent having a very small dipole moment or none at all. A most convenient solvent is dioxane. Other suitable substances, some of which may have to be used in solutions of benzene, toluene, xylenes, mesitylene, etc., because of their relatively high melting points, include diethylene diamine (piperazine), pyrazine, morpholine, 1,4-cyclohexane dione, 1,4-cyclohexane diol, etc.

For example, in a preferred application of the present invention to bentonitic seams containing incipiently dangerous amounts of water, said bentonitic seam is first treated with dioxane to remove at least a part of the water contained in said seam. The dioxane may be injected into and withdrawn from the seam in one large treatment or in several treatments of smaller volumes. Thereafter, a suitable quantity of mineral oil containing a cationic surface-active agent is injected into the bentonitic seam, whereby the beneficial result of the present invention, namely, the prevention of landslides, is obtained.

I claim as my invention:

1. A method of preventing landslides due to water absorption by underground bentonitic strata comprising the step of injecting into said strata a low viscosity mineral oil containing a small amount of an oleophilic surface cation active wetting agent.

2. A method of preventing landslides due to water absorption by underground bentonitic strata comprising the step of injecting into said strata a low viscosity mineral oil containing a small amount of both an oleophilic surface cation active wetting agent and an anion active compound.

3. A method of preventing water absorption by underground absorbent clay strata comprising the step of injecting into said strata a low viscosity mineral oil containing a small amount of an oleophilic surface cation active wetting agent.

4. A method of preventing further water absorption by underground bentonitic clay strata comprising the step of injecting thereinto a low viscosity petroleum distillate containing a small amount of an oleophilic surface cation active wetting agent.

5. A method of preventing further water absorption by underground clay strata comprising the step of injecting thereinto a low viscosity petroleum distillate containing a small amount of an oleophilic surface cation active wetting agent and an anion active agent.

6. A method of preventing landslides due to water absorption by underground bentonitic strata comprising the step of injecting into said strata a low viscosity mineral oil containing a small amount of an oleophilic surface cation active wetting agent, said mineral oil having a viscosity between about 50 and 500 seconds Saybolt Universal at 100° F.

7. A method of preventing landslides due to water absorption by underground bentonitic strata comprising the step of injecting into said strata a low viscosity mineral oil containing a small amount of "paraffin wax amines."

8. A method of preventing landslides due to water absorption by underground bentonitic strata comprising the step of injecting into said strata a low viscosity mineral oil containing a small amount of a quaternary ammonium compound having at least one saturated hydrocarbon chain of at least 8 carbon atoms.

9. A method of preventing landslides due to water absorption by underground bentonitic strata comprising the step of injecting into said strata a low viscosity mineral oil containing a small amount of a surface cation active amine having at least one aliphatic saturated hydrocarbon chain of at least 8 carbon atoms.

10. A method of preventing landslides due to water absorption by underground bentonitic strata comprising the step of injecting into said strata gas-oil containing a small amount of an oleophilic surface cation active agent.

11. A method of preventing landslides due to water absorption by underground bentonitic strata, which is in an incipiently dangerous condition due to a high water content, said method comprising the steps of first treating said bentonitic strata with a substantially non-polar solvent for water to remove at least a part of said water in the bentonitic strata, and thereafter injecting into said strata a low viscosity mineral oil containing a small amount of an oleophilic cationic surface active wetting agent.

12. A method of preventing landslides due to water absorption by underground bentonitic strata, which is in an incipiently dangerous condition due to a high water content, said method comprising the steps of first treating said bentonitic strata with dioxane to remove at least a part of said water in the bentonitic strata, and thereafter injecting into said strata a low viscosity mineral oil containing a small amount of an oleophilic cationic surface active wetting agent.

13. A method of preventing landslides due to water absorption by underground bentonitic strata, which is in an incipiently dangerous condition due to a high water content, said method comprising the steps of first treating said bentonitic strata with dioxane to remove at least a part of said water in the bentonitic strata, and thereafter injecting into said strata gas-oil containing a small amount of "paraffin wax amine."

VICTOR A. ENDERSBY.